Oct. 29, 1968   P. SUVADA   3,408,073
CHESS PIECES DISTINGUISHED BY COLOR
Filed June 29, 1964

INVENTOR.
PAUL SUVADA

United States Patent Office 3,408,073
Patented Oct. 29, 1968

3,408,073
CHESS PIECES DISTINGUISHED BY COLOR
Paul Suvada, 11012 Hulda Ave.,
Cleveland, Ohio 44104
Filed June 29, 1964, Ser. No. 378,875
3 Claims. (Cl. 273—137)

ABSTRACT OF THE DISCLOSURE

A chess game apparatus including a plurality of chess playing pieces adapted to be moved on a chess playing board, said pieces being of generally the same size and shape with respect to one another, the top of each piece including a color indicium thereon, said indicia being of generally the same shape in silhouette with respect to one another, and the color indicia including five different colors for providing a visual differentiation between the individual pieces.

Background of the invention

The present invention is closely associated with the game of chess by borrowing its rules, but adopting colors for definition of its pieces.

In learning and playing the game of chess, one first has to become familiar with the different sizes and shapes of pieces in order to recognize the same during plays. Because of these sizes and shapes on the board or because of their flattened symbols and diagrams which do not lend themselves readily to the eye, the game is not easy to learn to play well. As these pieces get lost among each other during games, even a well-trained person is used to falling behind or to losing on the basis of one or more oversights.

Summary of the invention

Therefore, the primary object of the invention is to provide the game of chess with color-marked pieces of uniform size and shape through which these pieces present themselves far more distinctly. The game itself is more practical to demonstrate and more stimulating to play. Because the pieces can be made with smooth surfaces and without off-center portions, they can be produced at a lower cost.

A further object of the invention is to provide the game's five different pieces with five different colors, like red for the former King, pink or purple for the former Queen, blue for the former Bishop, yellow for the former Knight, green for the former Rook, to enable the players to see those pieces clearly and definitely.

These, together with other objects and advantages which will become more apparent, are included in details of operation and are more fully explained with reference to the accompanying drawing which forms a part of this specification.

Description of the preferred embodiments

Figure 1:
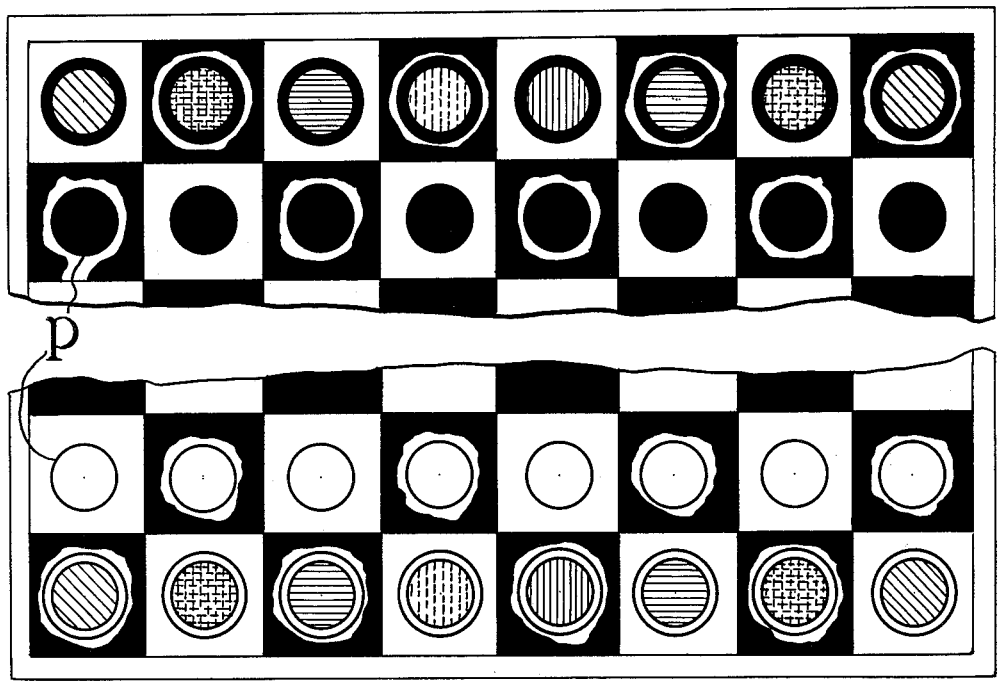
FIG. 1 is a fragmentary top plan view of the board with the pieces and the pawns deposited as for beginning the game. The colors of the pieces are represented by appropriate cross-hatching, with the pawns being designated by small letter character p.

Referring now specifically to FIG. 1 of the drawings, the sixteen pieces and the associated pawns for playing the game are positioned on an eight square by eight square board with colors indicated within their centers by the appropriate cross-hatching and with the reference character p denoting the pawns. In this starting position, as well as in the game, the colors on their light or dark supports take and keep the exact roles of the original chess pieces.

Figure 2:
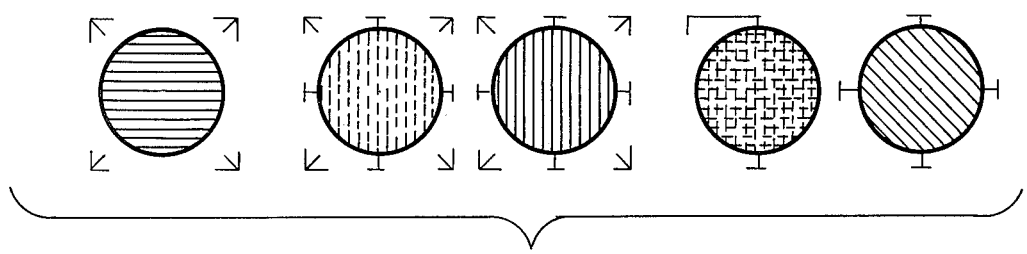
FIG. 2 is a schematic illustration which shows the cross-hatch designations for five colors (blue, purple or pink, red, yellow, green) which can be used for printed symbols and the associated moves of the respective pieces.

Now referring to FIG. 2, there is schematically illustrated by appropriate cross-hatch designation the five colors (blue, purple or pink, red, yellow, green) which can be used for printed symbols and the respective moves for the pieces, as follows:

Red—move and capture horizontally, vertically or diagonally moving only one square at a time, and so forth, as the former King;

Pink or purple—move and capture horizontally, vertically or diagonally, and so forth, as the former Queen;

Blue—move and capture diagonally, and so forth, as the former Bishop;

Yellow—move and capture in L-shapes, and so forth, as the former Knight; and

Green—move and capture horizontally or vertically, and so forth, as the former Rook.

The pawns p are colorless and they remain in every aspect the same as before. Colors, together with their supports representing the pieces, can be produced alternatively in any conventional shape, such as chips, disks or standing figures.

The foregoing is considered as illustrative only, and modifications and changes will readily occur to those skilled in the art. It is not desired to limit the invention to the exact construction and operation as shown and described. Accordingly, all suitable modifications may be resorted to which fall within the scope of the invention, as herein described and claimed.

I claim:

1. In a chess game apparatus, a plurality of chess playing pieces adapted to be moved on a chess playing board, all pieces being of the same size and shape, the top portion of the body of each chess playing piece including an indicium, said indicia being of the same shape in silhouette, said indicia including five different colors for providing a visual differentiation between the individual chess playing pieces.

2. A chess game apparatus in accordance with claim 1, wherein the colors are red, pink, blue, yellow and green.

3. A chess game apparatus in accordance with claim 1, wherein said plurality of pieces comprises 16 pieces, one group of 8 of said pieces having a light background and the other group of 8 of said pieces having a dark background, 2 pieces in each group having one of said 5 different colors, 2 other pieces in each group having another of said 5 different colors, 2 additional pieces in each of said groups having an additional one of said 5 different colors, one piece in each group having a further one of said 5 different colors, and another piece in each group having the last of said 5 different colors.

References Cited

UNITED STATES PATENTS

| 1,820,617 | 8/1931 | Holmberg | 273—137 |
| 3,149,843 | 9/1964 | Braun | 273—137 X |

FOREIGN PATENTS

| 777,545 | 12/1934 | France. |
| 17,898 | 11/1898 | Switzerland. |
| 538,009 | 7/1941 | Great Britain. |

DELBERT B. LOWE, *Primary Examiner.*